No. 802,130. PATENTED OCT. 17, 1905.
M. M. WOOD.
ELECTRIC MEASURING INSTRUMENT.
APPLICATION FILED MAY 29, 1902.

2 SHEETS—SHEET 1.

Witnesses.

Inventor:
Montraville M. Wood,
by Albert G. Davis
Atty.

No. 802,130. PATENTED OCT. 17, 1905.
M. M. WOOD.
ELECTRIC MEASURING INSTRUMENT.
APPLICATION FILED MAY 29, 1902.

2 SHEETS—SHEET 2

Witnesses.
Erving R. Gurney
Helen Orford

Inventor.
Montraville M. Wood
by Albert G. Davis
Atty.

UNITED STATES PATENT OFFICE.

MONTRAVILLE M. WOOD, OF SCHENECTADY, NEW YORK, ASSIGNOR TO GENERAL ELECTRIC COMPANY, A CORPORATION OF NEW YORK.

ELECTRIC MEASURING INSTRUMENT.

No. 802,130.    Specification of Letters Patent.    Patented Oct. 17, 1905.

Application filed May 29, 1902. Serial No. 109,439.

*To all whom it may concern:*

Be it known that I, MONTRAVILLE M. WOOD, a citizen of the United States, residing at Schenectady, county of Schenectady, State of New York, have invented certain new and useful Improvements in Electric Measuring Instruments, of which the following is a specification.

Among the objects of my present invention is the production of a measuring instrument suitable for testing rail-bonds or the like which shall be simple and cheap in construction and capable of making measurements with accuracy and rapidity.

The instrument operates upon the principle of the Wheatstone bridge and comprises certain novel features, which I have pointed out with particularity in the appended claims.

I have set forth my invention as to details of construction and mode of operation in the following description, which is to be taken in connection with the accompanying drawings, in which—

Figure 1:
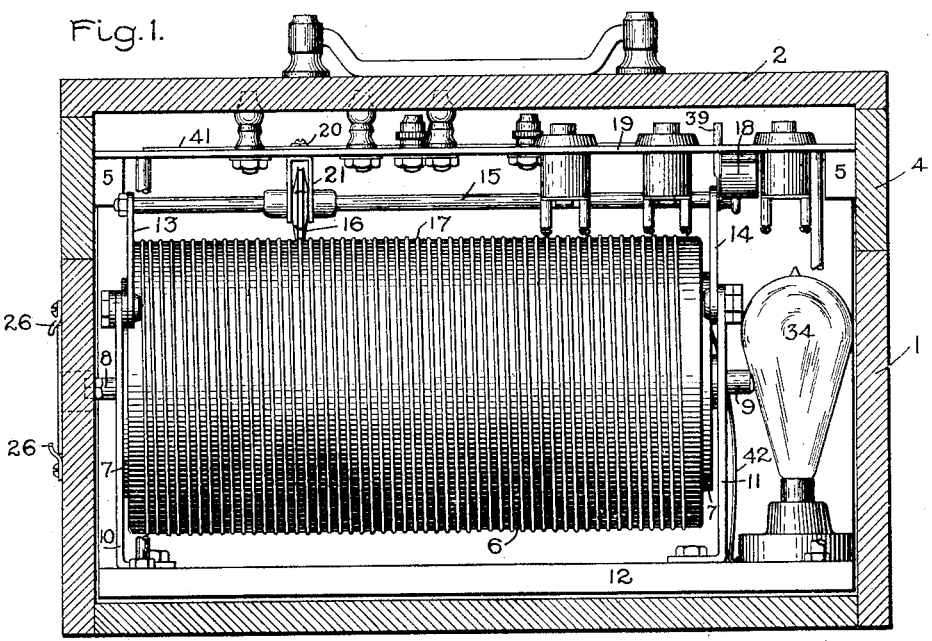
Figure 2:
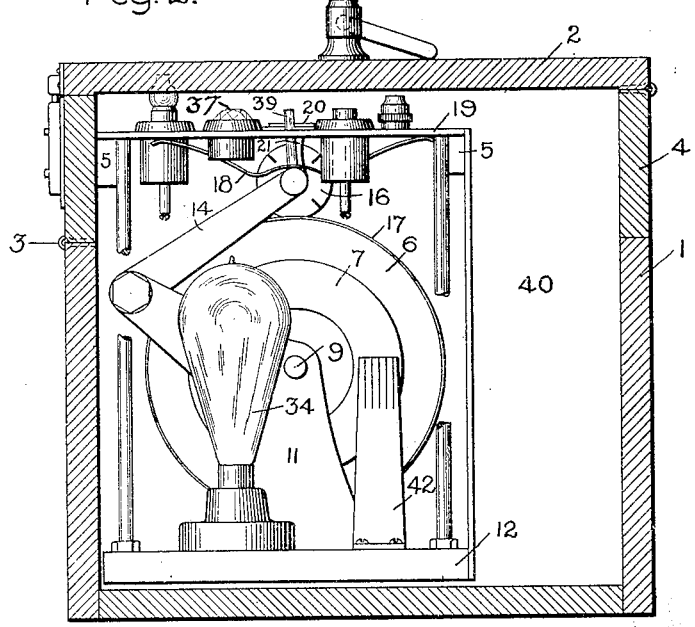
Figure 3:
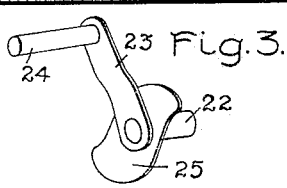
Figure 4:
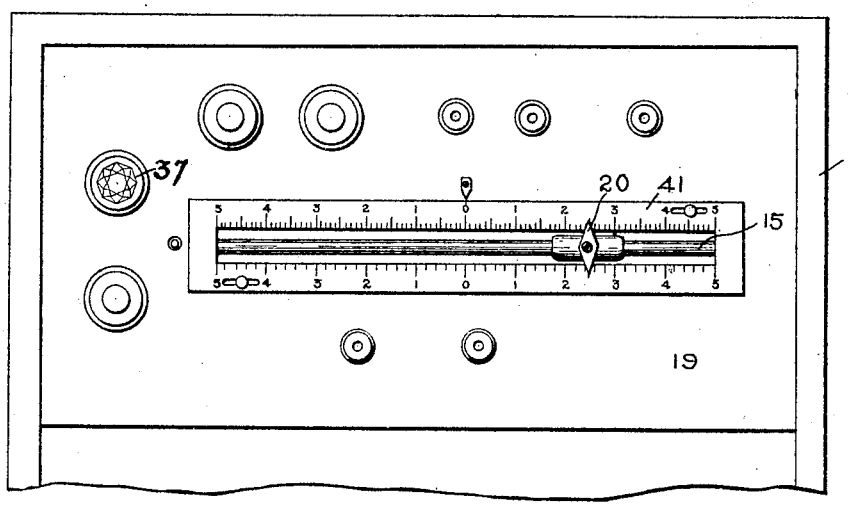

Figure 1 represents a longitudinal sectional view of a device embodying my invention; Fig. 2, a sectional view at right angles to that in Fig. 1; Fig. 3, a detail; Fig. 4, a plan view showing the pointer and scale of my measuring instrument, and Fig. 5 a diagram of circuits.

The several parts which go to make up my measuring instrument I have so arranged that they may be readily carried in a box or casing 1. This box has a hinged cover 2, which when it is lifted up exposes to view the scale, pointer, push-buttons, &c. (Shown in plan view in Fig. 4 and in end elevation in Fig. 2.) The box is also divided part way between the top and bottom along a plane parallel to the cover 2, the upper half being hinged to the lower at 3. The working parts of the instrument are carried by a framework attached to the upper section 4 of the box by strips 5 of wood or other material. When the upper section of the box is swung back on the hinges 3, the working parts of the instrument are swung out of the lower section of the box and are thus exposed to view, either for inspection or repair.

The working parts of the instrument inclosed in the box 1 include a helically-grooved cylinder 6 of insulating material having a resistance-wire of German silver or other suitable material wound in the groove, so as to project slightly above the surface of the cylinder. The ends of the resistance-wire are connected, respectively, to contact-rings, such as 7, secured to the two ends of the cylinder. The cylinder is carried by projecting studs 8 9, mounted in bearings consisting of angle-pieces 10 11, fixed to the bottom plate 12 of the framework attached to the strips 5 on the upper section 4 of the box by means of rods. (Shown partially broken away.) The angle-pieces 10 11 have projecting portions to which are pivoted swinging arms 13 14, joined by a connecting-rod 15. A contact-wheel 16 is mounted so as to be capable of rotation on the rod and of movement lengthwise thereof. This contact-wheel is grooved so that the groove engages and partially embraces the exposed surface of the resistance-wire 17, wound in the grooves of the cylinder 6. This contact-wheel is notched at intervals around its periphery, and these notches are filled with insulating material, so that as the wheel is revolved by rotation of the cylinder 6 the contact between the wheel and the resistance-wire is broken as often as the insulating material in the notches comes in contact with or passes over the surface of the resistance-wire.

The contact-wheel 16 is held in yielding engagement against the resistance-wire 17 by means of a spring 18, which presses down one end of the rod 15, the spring being inserted between the rod and the top plate 19 of the mechanism-carrying framework.

A pointer 20 is carried by a U-shaped slider 21, straddling the wheel 16, as indicated, and is movable along a scale 41, carried by the plate 19. This scale is adjustable, so that the zero-point of the instrument may be adjusted when occasion requires.

The cylinder 6 may be turned by means of a detachable crank. (Shown in Fig. 3.) This crank comprises a socketed sleeve 22, having a crank-arm 23 and a handle 24. The socket in this sleeve is of angular cross-section, so as to engage the flattened sides of the end of the stud 8. The crank is secured in place by means of a cam-like member 25, which when the socket has been placed in engagement with the stud 8 is adapted to slide under and bind beneath coöperating clips 26, fixed to the outside of the box 1. The cam-like member 25 is mounted upon a reduced portion of the socket-piece 22, so as to be rotatable thereon, but incapable of longitudinal movement.

Electrical connections are made with the parts of the mechanism described above by means of contact-brushes 42 and binding-posts, push-buttons, &c., to which reference in detail is not necessary.

Figure 5:
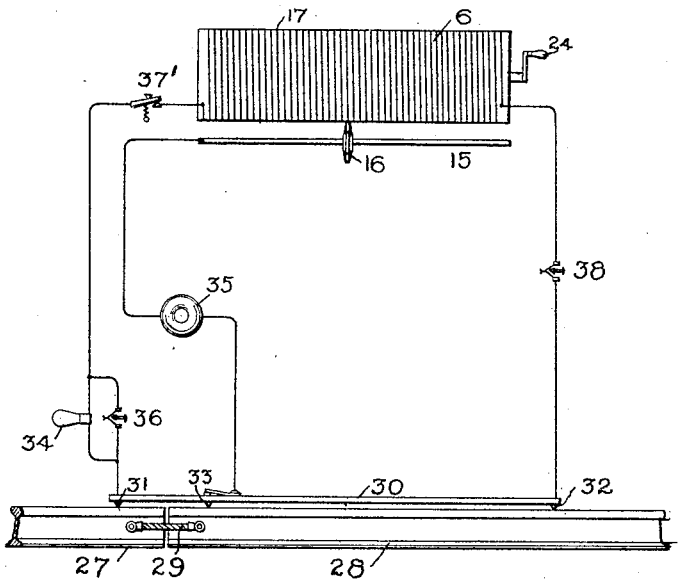

The connections will be best understood by referring to Fig. 5, in which the grooved cylinder, with the resistance-wire, is indicated at 6 and the sliding wheel coöperating therewith at 16, the rod upon which the wheel slides being in turn represented at 15. The figure represents the instrument as arranged for testing the resistance of rail-bonds by comparing a section, including the rail-joint, consisting of two adjacent rail ends 27 and 28, electrically connected by the rail-bond 29, with a continuous section of rail of predetermined relative length. A rod 30, carrying contact-points, is adapted to make connection with these rails. This rod, as shown, carries two contact-points 31 32, fixed to the respective ends of the rod 30, and a spring-pressed contact 33, mounted between the contacts 31 and 32 at a predetermined position between them. The contact 31 is connected, through a small incandescent lamp 34, to one end of the resistance-wire on the cylinder 6, while the other contact 32 is connected to the other end of the resistance-wire. The intermediate spring-pressed contact 33 is connected through a microphone 35 to the rod 15, carrying the movable contact-wheel 16.

The instrument as thus connected is intended for use when current is flowing through the rails 27 28, due, for example, to the passage of electric railway-vehicles. The connections above described will be seen to constitute an arrangement corresponding to the usual Wheatstone bridge, in which the portion of the rail between the contacts 32 and 33 of known resistance constitutes one side of the bridge, the ends of the rails connected by the rail-bond 29 between the contacts 31 and 33, an unknown resistance, constituting another side of the bridge, and the portions of the resistance-wire on the cylinder 6, lying on either side of the traveling contact 16, constituting the corresponding sides of the other half of the bridge. By rotating the cylinder 6 by means of the crank or otherwise the traveling contact 16 will follow along the resistance-wire on the cylinder and by the passage of its insulating-sections over the resistance-wire will rapidly make and break the circuit of the bridge-wire, including the microphone 35. When the traveling contact 16 is in a position on the resistance-wire such that the portions of the resistance-wire on either side of the point of contact bear the same relation to each other in resistance as the corresponding portions of the rails between the contacts 31 33 and 33 32, there will be no sound or comparatively no sound in the microphone 35; but when this balance does not exist the rotation of the cylinder 6 will cause a series of current-impulses to pass through the microphone 35, thereby causing audible indication of the fact that the bridge is not in a condition of balance. In order to balance the bridge, the cylinder 6 is rotated backward and forward until the sound produced in the microphone decreases to a condition of minimum audibility. No other action on the part of the operator in balancing the instrument is necessary other than that required to rotate the cylinder 6, this rotation being made backward or forward, as the case may be, until the condition of balance is reached. The scale over which the pointer 20, carried by the traveling contact 16, moves furnishes a convenient means for obtaining the ratio between the resistances of the portions of the resistance-wire on either side of the point of engagement of the traveling contact 16. The ratio of these portions to each other represents the ratio between the resistance of the rail-bond section of the rails and the continuous section with which comparison is made.

It may happen in practice that a rail-bond is so imperfect as to present a high resistance between the joints of the rails, and therefore a high fall of potential to exist when current is flowing in the rails. If the testing instrument were to be applied to a rail-joint thus highly defective, it might readily happen that so much current would flow through the instrument as to destroy the same. To provide against this contingency, I connect a relatively high-resistance-indicating device, such as the incandescent lamp 34, in series with the contact 31, and about this lamp I place a short-circuiting switch or push-button 36. If when the apparatus is connected up for testing the resistance of the rail-joint there should happen to be an unduly high resistance or an open circuit at the joint, the incandescent lamp 34 would light up, and the light from the lamp, shining up through the jewel or lens 37 in the plate 19, would immediately attract the attention of the operator, thereby notifying him immediately, without the necessity for further test, of the defective condition of the rail-bond. If such a defective condition of the rail-bond does not exist, the lamp 34 does not light up, and the operator then proceeds to close the switch 36 about the lamp, thereby cutting it out of circuit, after which the cylinder 6 is rotated until a condition of balance is reached as before described.

In order to save time in adjusting the traveling contact, I place in each bridge-wire connected to the contact-points 31 and 32 a spring-closed circuit-opening switch, as at 37' and 38. By opening and closing first one switch and then the other the relative audibility of the sounds produced in the microphone 35 indicates the direction in which the traveling contact should be moved to produce a condition of balance. Thus if when the switch 38 is opened a louder sound is produced in the microphone 35 than when the switch 37 is opened it is evident that the resistance to the right of the traveling contact is too low and that on the other side too high. The handle 39, fixed to the rod 15, may then be lifted against the tension of the spring 18, thereby lifting the traveling contact 16 out of engagement with the resistance-wire 17, whereupon it may be slid toward the position corresponding to a balanced condition of the bridge. The exact adjustment may then be secured by trial by rotating the cylinder 6 backward or forward until the sounds produced by the microphone are a minimum or until they disappear altogether.

It will be evident that instead of depending upon current in the rails to make the measurements I may make use of an independent source of current, which for the sake of portability may consist of a number of dry batteries, for which I provide space in the box 1, as at 40. This space also is intended to carry the microphone, the turning-crank 23, connecting-cord, and the like. When I make use of a portable source of current, I connect one battery or cell in the bridge-wire connected to the contact 32 and the other in the bridge-wire connected with contact 31. These cells are connected with their unlike terminals to the contacts 31 and 32. By placing equal resistances between the bridge terminal 30 and the terminals 31 32 and then balancing the bridge the pointer moved by the contact 16 assumes the zero position. If the electromotive forces of the two batteries or coils are not equal, this zero-point may not correspond to the zero-point of the scale, which is then adjusted longitudinally until coincidence takes place.

What I claim as new, and desire to secure by Letters Patent of the United States, is—

1. A circuit-interrupter consisting of a grooved metallic wheel having a notched periphery, and insulating material in the notches.

2. A circuit-interrupter consisting of a grooved metallic wheel having a notched periphery, and insulating material in the notches trimmed flush with the walls of the groove.

3. The combination of a resistance-wire, a contact-piece adapted to continuously traverse the same, and means for periodically interrupting the electrical conductivity at the point of contact.

4. In a resistance-measuring instrument, the combination of the resistance-wire, a contact-piece adapted to make a traveling engagement with said wire, and means whereby relative movement of said wire and contact-piece causes a periodic making and breaking of the circuit including said resistance-wire and contact-piece.

5. The combination of a resistance-wire, and a wheel having its edge notched and the notches filled with insulating material.

6. The combination of a resistance-wire, and a coöperating grooved wheel having the conductivity of its periphery interrupted at intervals.

7. The combination of a cylinder having a resistance-wire wound thereon, means for rotating the cylinder, and a grooved wheel adapted to roll on said resistance-wire as the cylinder is rotated, said grooved wheel having its periphery notched and the notches filled with insulating material.

8. The combination of a grooved wheel having its periphery notched and the notches filled with insulating material, a resistance wire or conductor, means for holding said grooved wheel yieldingly against said resistance wire or conductor, and means for moving said resistance wire or conductor relatively to said wheel.

9. The combination of a resistance-wire, a traveling contact-wheel having the conductivity of its periphery interrupted at intervals, said wheel being adapted to roll along said wire, a rod upon which said wheel is slidably mounted, means for holding said contact in yielding engagement with said wire, and means for producing relative motion between said contact and said wire.

10. The combination of a cylinder, a resistance-conductor wound thereon, a contact-piece adapted to travel on said resistance-conductor, and means responsive to rotation of said cylinder for interrupting the circuit through said resistance-conductor and contact-piece.

11. The combination of a resistance-wire, a mechanical support therefor, a traveling contact adapted to engage said wire, and means responsive to relative movement between said wire and contact for periodically interrupting the circuit through said wire and contact.

12. The combination of a cylinder, a resistance-wire carried thereby, and a traveling contact adapted to engage said wire, said traveling contact adapted to make and break circuit with said resistance-wire when said cylinder is rotated.

13. The combination of a cylinder having a resistance-wire wound thereon, means for rotating the cylinder, and a rolling contact adapted to engage said wire and to make and break circuit with said wire when said cylinder is rotated.

14. In a resistance-measuring instrument, the combination of the resistance-wire, a contact-wheel having the conductivity of its periphery interrupted at intervals, means for holding the contact-wheel in yielding engagement with the wire, and means for causing relative movement between the wire and contact-wheel, thereby causing a periodic interruption of the circuit between said wheel and wire.

15. The combination of a resistance-wire, a movable support for said wire, and a grooved contact-wheel having the conductivity of its periphery interrupted at intervals, said wheel being adapted to roll along said wire and by its engagement to be rotated about its axis and moved in the direction of its axis.

16. The combination of a cylinder, a resistance-wire carried thereby, a rod extending longitudinally of the cylinder and spring-pressed toward the cylinder, and a traveling contact slidably mounted upon said rod and adapted to engage said wire.

17. The combination of a resistance-wire, a mechanical support therefor, a traveling contact adapted to engage said wire, a rod upon which said traveling contact is mounted, and means for urging said rod toward said support.

18. The combination of a resistance-wire, a traveling contact adapted to be moved along said resistance-wire, a bridge-wire including an indicating device electrically connected to said contact at one end, conductors extending from the ends of said resistance-wire, three contact-points adapted to be placed in engagement with rails to be tested, a connection between the intermediate contact-point and one end of said bridge-wire, connections between the other contact-points and the ends of the conductors connected to said resistance, an incandescent lamp in series with one of the conductors connected to said resistance-wire, and a switch adapted to short-circuit said lamp.

19. The combination of a resistance-wire, a traveling contact adapted to engage therewith, three contact-points adapted to be placed against rails to be tested, a bridge-wire connecting the intermediate contact to said traveling contact and including an indicating device such as a microphone, conductors connecting the remaining contact-points with the respective ends of said resistance-wire, and a circuit-opening switch in each of said conductors.

20. In a resistance-measuring device, the combination of a retaining-box divided into two sections, one hinged to the other, a cover hinged to one of the sections, and means for supporting working parts of the instrument from one only of said sections.

21. The combination of a resistance-wire mounted on a support, a contact-wheel adapted to be rotated by engagement therewith, and insulating material let into the contact-making portion of said wheel so as to interrupt its conductivity at a number of points.

22. The combination of a resistance-wire, and a contact-wheel adapted to be rotated by engagement therewith, said contact-wheel having the conductivity of its contact-surface interrupted.

In witness whereof I have hereunto set my hand this 27th day of May, 1902.

MONTRAVILLE M. WOOD.

Witnesses:
BENJAMIN B. HULL,
HELEN ORFORD.